Figure 1:
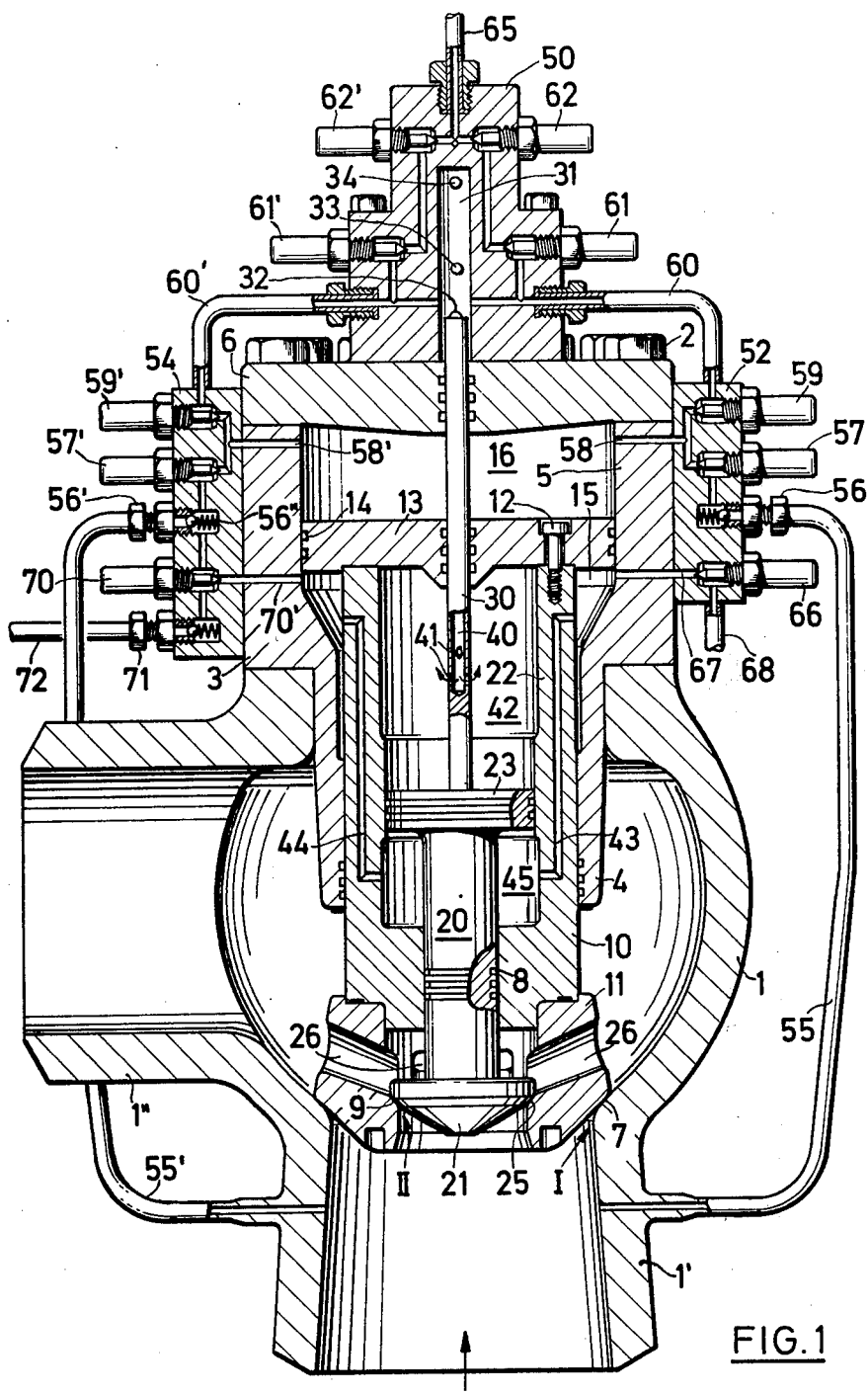

United States Patent

Grotloh

[11] 4,041,980
[45] Aug. 16, 1977

[54] CONTROL VALVE HAVING TWO INDEPENDENTLY DRIVEN VALVES

[75] Inventor: Karlheinz Grotloh, Winterthur, Switzerland

[73] Assignee: Sulzer Brothers Ltd., Winterthur, Switzerland

[21] Appl. No.: 706,149

[22] Filed: July 19, 1976

[30] Foreign Application Priority Data

July 25, 1975 Switzerland .................. 9709/75

[51] Int. Cl.² ............................................. F16K 11/22
[52] U.S. Cl. .................................................. 137/599.2
[58] Field of Search ............................ 137/599.2, 637.2

[56] References Cited

U.S. PATENT DOCUMENTS 2,829,670  4/1958  Nix ............................... 137/637.2 X
3,734,134  5/1973  Vogeli ............................. 137/637.2

Primary Examiner—Robert G. Nilson
Attorney, Agent, or Firm—Kenyon & Kenyon, Reilly, Carr & Chapin

[57] ABSTRACT

The control valve has a quick-acting main valve and a safety valve which are independently operated either by the working medium which is being controlled or by an auxiliary pressing medium. The safety valve includes a rod which is secured to the piston of the safety valve drive and which extends through the piston of the servo-motor drive of the main valve. This rod has a longitudinal passage which communicates the upper chamber of the servo-motor for the safety valve with a discharge line for venting purposes or with the pressure medium in the upper chamber of the servo-motor of the main valve for closing purposes.

7 Claims, 4 Drawing Figures

CONTROL VALVE HAVING TWO INDEPENDENTLY DRIVEN VALVES

This invention relates to a control valve having two independently driven valves.

Heretofore, various types of valves have been known to use pairs of valve spindles and valve bodies in order to control a flow of working medium. For example, in one known valve combination, both a main valve and an auxiliary valve have been used in a concentric arrangement. In this case, the main valve has usually had a valve body mounted on a spindle to cooperate with a valve seat while the second valve has had a valve body mounted on a spindle concentrically within the main valve which valve body cooperates with a valve seat in the main valve. The spindle of the main valve has also had a guide or the like to guide the spindle of the second valve. Thus, these valves are in parallel and are capable of independent operation by separate independent drives. In addition, the drive for the second valve has been rigidly connected to the spindle of the main valve and both drives have been in the form of pressure-medium-operated servo-motors.

However, the valve combinations of the above type usually have complicated drives which are bulky and expensive. Further, the complexity of these valves has impaired the reliability of these valves in operation.

Accordingly, it is an object of the invention to provide a control valve having two valves with a simple drive.

It is another object of the invention to provide a control valve of dual valve type which is highly reliable in operation.

It is another object of the invention to provide a control valve of a dual valve construction which is not too elaborate.

Briefly, the invention provides a control valve of dual-valve type which is constructed with a main valve and a second valve. The main valve includes a movably mounted hollow spindle, a first valve body mounted on the spindle having a passage for a flow of working medium, and a valve seat about the passage. The second valve includes a spindle movably mounted concentrically within the hollow spindle and a second valve body mounted on the spindle for sealingly seating on the valve seat of the main valve in order to close the passage through the main valve body.

In addition, a piston is secured to the spindle of the main valve and a piston is secured to the spindle of the second valve and slidably received within the hollow spindle to define two chambers therein. These pistons are parts of servo-motors which serve to drive the respective valves. A rod is also secured to the second piston and extends through the first piston. This rod has a passage communicating one of the chambers in the hollow spindle with an open end of the rod. In addition, a means is provided for selectively delivering a pressure medium through the rod passage to the chamber of the hollow spindle or for venting the chamber through the rod passage.

Preferably, the longitudinal passage of the rod communicates with that cylinder chamber of the servo-motor associated with the second valve which is remote from the valve body of this spindle.

The control valve also employs a housing having at least a pair of spigots for a flow of working medium and a valve seat about one spigot on which the valve body of the main valve can seat.

Those cylinder chambers of the two servo-motors which are near the valve bodies can also communicate with one another via a duct.

Preferably, the medium to be controlled by the valve is used as a pressure medium.

The control valve can have a connection for an alternative mode of operation via an independent pressure medium source. Preferably, the first valve is connected as a quick-closing valve, whereas the second valve is connected as a safety valve.

Figure 2:
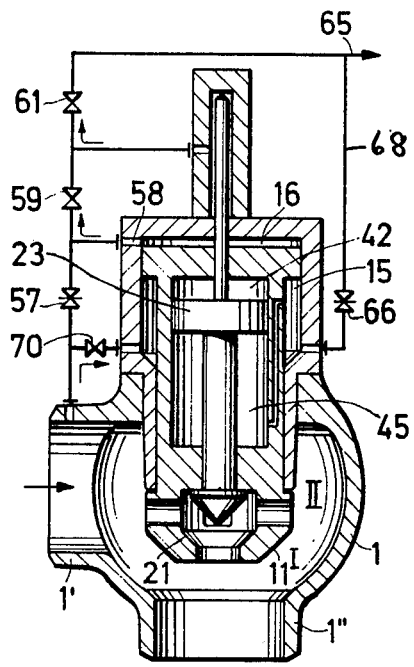
Figure 3:
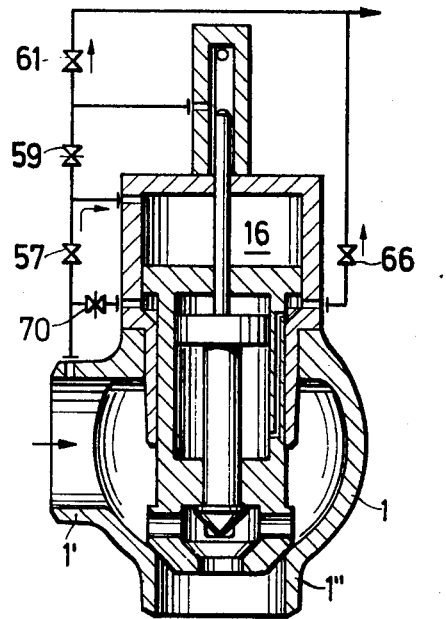
Figure 4:
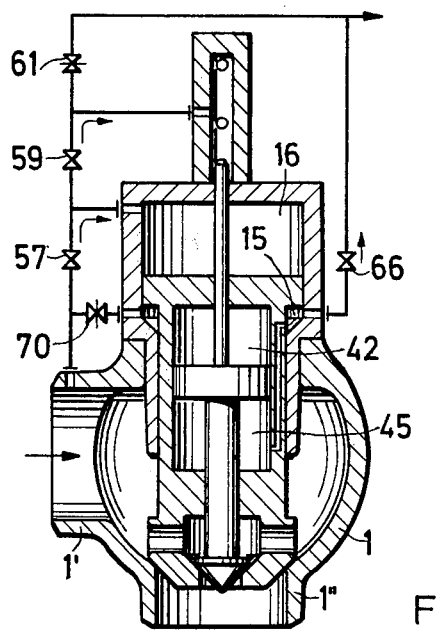

These and other objects and advantages of the invention will become more apparent from the following detailed description and appended claims taken in conjunction with the accompanying drawings in which:

FIG. 1 illustrates an axial section through a control valve according to the invention; and FIGS. 2, 3 and 4 are diagrammatic axial sections similar to FIG. 1 to show how the valve operates.

Referring to FIG. 1, the valve includes a valve housing 1 having an inlet spigot 1' and an outlet spigot 1∝1. An insert 3 fits into the valve housing 1 and is secured thereto via bolts 2. This insert 3 forms a valve guide 4 an is of hollow construction to define a first cylindrical chamber 5 which is closed by a cover 6. The cover 6 is secured to the insert 3 via the bolts 2.

A first or quick-closing valve I is formed within the housing 1 by means of a spindle 10 which carries a valve body 11 and a valve seat 7 on the housing 1. As shown, the spindle 10 is slidably mounted within the valve guide 4 for movement of the valve body 11 towards and away from the valve seat 7 while the valve body 11 has a central passage 25 about which a second valve seat 9 is formed. The spindle 10 is also secured, via bolts 12, to a piston 13 which is movable in seal-tight manner, via piston rings 14, in the cylinder chamber 5. As shown, the piston 13 divides the chamber 5 into a lower cylindrical chamber 15 near the valve body 11 and an upper cylindrical chamber 16 remote from the valve body 11.

The piston 13 cooperates with the insert 3 to form a servo-motor which operates the valve I, the spindle 10 forming the piston rod of the servo-motor.

A second or safety valve II is also mounted in the housing 1 within the first valve I. To this end, the second valve II is formed of the valve seat 9 in the valve body 11, a spindle 20 which is slidably mounted concentrically within a valve guide 8 of the spindle 10, and a valve body 21 threaded onto the spindle 20. The spindle 10 is hollow in order to define a cylindrical chamber 22 and the spindle 20 carries a piston 23 which is slidably mounted in the chamber 22 to subdivide the chamber 22 into upper and lower cylindrical chambers 42, 45.

The piston 23 cooperates with the spindle 10 to form a servo-motor for actuating the valve II with the spindle 20 acting as the servo-motor piston rod.

The valve body 11 is formed with a plurality of ports 26 which communicate the internal passage 25 with the exterior of the valve body 11. When the valve body 21 is raised from the valve seat 9, the ports 26 are able to pass a working medium through the valve body 11. Thus, even though the main quick-closing valve I is closed, the safety valve II may be open.

A position detector is disposed within the valve in order to indicate the position of the safety valve II. To this end, the position detector includes a head member 50 which is mounted on the cover 6 as by bolts and which defines a cylindrical measuring chamber 31. In addition, the safety valve II has a rod 30 which extends from the piston 23 through the piston 13 and cover 6 and which terminates within the cylindrical measuring chamber 31. Also, a plurality of e.g. three, position sensors or detectors 32, 33, 34 are located within the measuring chamber 31. These sensors 32-34 function to produce different electrical signals in dependence on the position of the rod 30.

The rod 30 is formed with a longitudinal passage 40 which communicates via wall passages 41 with the upper cylindrical chamber 42 remote from the valve body 21 as well as with the measuring chamber 31 at the open end.

The spindle 10 includes two ducts 43, 44 which interconnect the two cylinder chambers 15, 45 of the servomotors located closest to the valve body 11.

In order to operate the valve, various connections are made between the chambers and the inlet spigot 1' as well as with an external or auxiliary pressure medium source. For this purpose, a pair of side members 52, 54 are diposed laterally on the insert. Also, a pair of lines 55, 55' extend on opposite sides of the control valve from the inlet spigot 1' to check valves 55, 56' disposed in the side members 52, 54. These check valves 56, 56' are connected on the downstream side by way of a respective duct in the side members 52, 54 to one chamber each of two solenoid valves 57, 57'. These chambers are, in turn, connected by way of ducts 58, 58' to the cylinder chamber 16 remote from the valve body 11 and to solenoid valves 59, 59' also disposed in the side members 52, 54. The other sides of the solenoid valves 59, 59' are connected each by way of a line 60, 60' to the measuring chamber 31. The measuring chamber 31 is, in duplicate, connected with a discharge line 65 via two series-connected solenoid valves 61, 62 and 61', 62', respectively. The cylinder chamber 15 is connected via a solenoid valve 66 and a passage 67 in one side member 52 to a discharge line 68. In similar fashion, the cylinder chamber 15 is also connected via a solenoid valve 70 and a passage 70' to a downstream chamber 56" of the check valve 56' in the side member 54.

In addition, an auxiliary pressure medium source (not shown) e.g. a container of pressurized nitrogen, is connected via a line 72 and a check valve 71 in the side member 54 to the solenoid valve 70 and line 70' to the cylindrical chamber 15 as well as to the downstream chamber 56" of the check valve 56'. This connection allows operation of the valve independently of the pressure in the inlet spigot 1'.

The check valves 56, 56', 71 are safety devices. Should any of the lines 55 or 55' or 72 fracture, the check valves 56, 56', 71 prevent pressure medium from escaping from the pressure-medium-filled cylinder chambers of the servo-motors.

In the embodiment described, the duplication of some elements is intended to show how redundancy can increase the reliability of operation of the valve combination. So as not to overload the drawings, this redundancy feature is not consistently shown, since the skilled addressee knows that the safety of the valve combination can be increased by the provision of additional elements in parallel or series and knows how to do this.

The operation of the valve combination will be described hereinafter with reference to the diagrammatic FIGS. 2-4. For the sake of clarity the redundant elements are omitted from FIGS. 2-4. The working medium which the valve combination is required to control flows in the opposite direction as compared with FIG. 1.

FIG. 2 shows the valve fully open, i.e. the two valves I, II are fully open. In order to move the valve into this fully open position, the solenoid valves 57 and 66 first close, a state indicated by a transverse line through the valves. Solenoid valve 70 then opens, so that the cylinder chambers 15, 45 nearer the valve bodies 11, 21 are connected to the inlet spigot 1'. The solenoid valves 59, 61, 62 (the latter is not shown in FIG. 2) open simultaneously, so that pressure is reduced in the two cylinder chambers 16, 42 (which are remote from the valve bodies 11, 21) since these latter chambers are then connected to the discharge line 65 where the pressure is lower than the pressure acting on the valve bodies 11, 21. The cylinder chamber 16 communicates with the discharge line 65 by way of duct 58 while the cylinder chamber 42 communicates with the discharge line 65 by way of the longitudinal passage 40 in the rod 30. With the valve in this position, the end of the rod 30 is at the height of the uppermost sensor 34. The sensor 34 thus produces a signal corresponding to this position.

FIG. 3 shows the valve partly open, i.e. valve I is in the closed state and valve II is fully open. In this position, the cylinder chamber 16 remote from main valve body 11 receives pressure medium from the inlet spigot 1' via the valve 57 which is now open. In addition, the valves 70 and 59 are in the closed state and the valves 66, 61, 62 (the latter is not shown in FIG. 3) are open. Thus, the cylinder chambers 45 and 15 are in communication with the discharge line 68 while the cylinder chamber 42 is in communication with the discharge line 65. As shown, the discharge line 68 connects to the discharge line 65. With the valve in this position, a corresponding signal is produced by the position sensor 33.

FIG. 4 shows the valve fully closed, i.e. both valves I, II are in the closed state. In this position, there is no pressure acting in the two cylinder chambers 15, 45 since the valve 66 is open and valve 70 is in the closed state. However, the valves 57, 59 are open and the valve 61 is in the closed state. Thus, the two cylinder chambers 16, 42 are pressurized. The position sensor 32 thus produces a signal corresponding to this position of the valve.

The various solenoid valves 57, 57', 59, 59', 61, 61', 62, 62', 66 and 70 are operated by any suitable control means (not shown) so as to carry out the function of the valve and to place the valve in the various positions shown in FIGS. 2-4. For example, in order to open the valve from the position shown in FIG. 1, the following program is initiated:

| VALVE | POSITION |
| --- | --- |
| 57, 57' | Closed |
| 66 | Closed |
| 70 | Open |
| 59, 59' | Open |
| 61, 61' | Open |
| 62, 62' | Open |

This causes the working medium in the valve spigot 1' to flow via the line 55', check valve 56', solenoid valve 70 and line 70' into the chambers 15, 45. At the same time, the chamber 16, 42 are vented to the discharge line 65. Thus, both valves I, II are raised under the pressure of the working medium.

Next, in order to close the quick-acting main valve I, the following program is initiated:

| VALVE | POSITION |
| --- | --- |
| 57, 57' | Open |
| 59, 59' | Closed |
| 70 | Closed |
| 61, 61' | Open |
| 62, 62' | Open |
| 66 | Open |

This causes the working medium in the valve spigot 1' to flow via the line 55, 55', check valves 56, 56', solenoid valves 57, 57' and lines 58, 58' into the chamber 16. At the same time, the chamber 15 is vented to the discharge line 68. Thus, the main valve I is closed while the safety valve II remains open. It is to be noted that the travel of the piston 20 of the safety valve II is limited downwardly as viewed by the valve seat 9 and upwardly by the piston 10 both of which act as abutments for the valve body 21.

Next, in order to close the safety valve II, the following program is initiated:

| VALVE | POSITION |
| --- | --- |
| 66 | Open |
| 70 | Closed |
| 57, 57' | Open |
| 59, 59' | Open |
| 61, 61' | Closed |
| 62, 62' | Closed |

This causes the working medium in the valve spigot 1' to flow not only via the lines 55, 55', check valves 56, 56', solenoid valves 57, 57' and lines 58, 58' to the chamber 16 but also via the solenoid valves 59, 59', lines 60, 60' and passage 40 in the rod 30 to the chamber 42. At the same time, the chambers 15, 45 are vented via the discharge line 68. Thus, the safety valve II closes under the pressure of the working medium.

The signals from the sensors 32, 33, 34 may also be transmitted to a suitable means e.g. visually indicate the position of the safety valve II.

The invention thus provides the advantages of a simple clear construction, fast closing of the fast-closing valve, very reduced discharge of medium in valve operation and high reliability of operation.

What is claimed is:

1. A control valve comprising
    a housing having at least a pair of spigots for a flow of working medium therethrough and a first valve seat therein;
    a main valve including a movably mounted hollow spindle, a first valve body mounted on said spindle for sealingly seating on said first valve seat, said valve body having a passage for a flow of working medium therethrough, and a second valve seat within said first valve body about said passage;
    a second valve including a second spindle movably mounted concentrically within said hollow spindle and a second valve body mounted on said second spindle for sealingly seating on said second valve seat;
    a first servo-motor for moving said main valve and including an insert mounted in said housing and defining a cylindrical chamber, and a first piston secured to said hollow spindle and slidably received in said insert to subdivide said chamber into a pair of chambers;
    a second servo-motor for moving said second valve and including a second piston secured to said second spindle and slidably received in said hollow spindle to define two chambers therein;
    a rod secured to said second piston and extending through said first piston, said rod having a longitudinal passage communicating one of said chambers within said hollow spindle of said second servo-motor with an end of said rod; and
    means mounted on said housing to define a chamber, said latter chamber receiving said end of said rod therein to selectively deliver a pressurized medium to said one chamber and to vent said one chamber.

2. A control valve as set forth in claim 1 wherein said one chamber of said second servo-motor is remote from said first valve body.

3. A control valve as set forth in claim 1 wherein said first spindle includes at least one duct communicating the cylinder chambers of each servo-motor located closest to said first valve body.

4. A control valve as set forth in claim 1 which further comprises at least one line connected to one of said spigots and valve means selectively connecting said chambers of said servo-motors to said line whereby the working medium to the controlled is used as a pressure medium to control said servo-motors.

5. A control valve as set forth in claim 4 wherein said valve means includes an auxiliary pressure medium source for controlling said servo-motors.

6. A control valve as set forth in claim 1 wherein said means for defining a chamber including at least one position defector for producing a signal in dependence on the position of said rod.

7. In a control valve, the combination of
    a main valve including a movably mounted hollow spindle, a first valve body mounted on said spindle, said valve body having a passage for a flow of working medium therethrough and a valve seat about said passage;
    a second valve including a second spindle movably mounted concentrically within said hollow spindle and a second valve body mounted on said second spindle for sealingly seating on said valve seat to close said passage;
    a first piston secured to said first spindle;
    a second piston secured to said second spindle and slidably received within said hollow spindle to define two chambers therein;
    a rod secured to said second piston and extending through said first piston, said rod having a passage communicating one of said chambers within said hollow spindle with an open end of said rod; and
    means for selectively delivering a pressure medium through said passage of said rod to said one chamber and venting said one chamber through said passage of said rod.

* * * * *

UNITED STATES PATENT AND TRADEMARK OFFICE
CERTIFICATE OF CORRECTION

PATENT NO. : 4,041,980
DATED : August 16, 1977
INVENTOR(S) : Karlheinz Grotloh

It is certified that error appears in the above-identified patent and that said Letters Patent are hereby corrected as shown below:

In the Abstract, 4th line - change "pressing" to

-- pressure --

Column 3, line 23, change "55" to --56--

Signed and Sealed this

Twenty-fifth Day of April 1978

[SEAL]

Attest:

RUTH C. MASON
Attesting Officer

LUTRELLE F. PARKER
Acting Commissioner of Patents and Trademarks